(12) United States Patent
Satoh et al.

(10) Patent No.: US 6,326,974 B1
(45) Date of Patent: *Dec. 4, 2001

(54) METHOD AND APPARATUS FOR COLORING SUPPORT

(75) Inventors: Youichi Satoh; Johji Tajima, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,982

(22) Filed: Mar. 30, 1999

Related U.S. Application Data

(63) Continuation of application No. 08/511,149, filed on Aug. 4, 1995, now abandoned.

(30) Foreign Application Priority Data

Aug. 4, 1994 (JP) .................................................. 6-183348

(51) Int. Cl.$^7$ ........................................................ G09G 5/02

(52) U.S. Cl. ........................ 345/581; 345/601; 345/593; 345/602; 345/606

(58) Field of Search .................................. 345/150, 153, 345/199, 151, 152, 581, 593, 601, 602, 606, 431; 358/523, 1.9; 382/274, 270

(56) References Cited

U.S. PATENT DOCUMENTS

| | | | |
|---|---|---|---|
| 4,337,046 | 6/1982 | Anderson et al. | 434/103 |
| 4,958,147 | 9/1990 | Kanema et al. | 340/706 |
| 5,185,850 | 2/1993 | Usui et al. | 395/22 |
| 5,222,206 | 6/1993 | Liao | 345/431 |
| 5,249,263 | 9/1993 | Yanker | 345/431 |
| 5,311,212 | 5/1994 | Beretta | 345/150 |
| 5,424,945 | 6/1995 | Bell | 364/419.2 |
| 5,473,738 | 12/1995 | Hamlin et al. | 345/431 |

(List continued on next page.)

FOREIGN PATENT DOCUMENTS 6-203118    7/1994   (JP) .

OTHER PUBLICATIONS

Naya, "Industrial Color Science", Asakura Verlag, 1980, pp. 106, 107, 102, 103 and 202.

Primary Examiner—Richard Hjerpe
Assistant Examiner—Ali A. Zamani
(74) Attorney, Agent, or Firm—Foley & Lardner

(57) ABSTRACT

A coloring support apparatus comprises a table storage section to store a coloring table having an emphasis column for describing the degree of color emphasis of a domain in a linear graphic image to be colored, and a color coordinate column for describing a color coordinate value in any color space in the domain to be colored for each image element constituting the linear graphic image, a whole color tone column for describing the impression of coloring; a color number determination section for determining the number of colors according to the coloring table; a hue determination section for determining hue values according to the number of colors obtained by the color number determination section; a reference coordinate determination section for determining the tone, saturation and brightness of a color corresponding to the impression of coloring described in the whole color tone column; a color generation section for determining the saturation and brightness values of the hue of colors according to coordinates of the plane with the same hue at the reference point for description in the color coordinate column; and a coloring section for referencing the coloring table covering a certain value in the each column to determine color coordinates for the color coordinate column and color the linear graphic image.

7 Claims, 18 Drawing Sheets

U.S. PATENT DOCUMENTS

| | | | |
|---|---|---|---|
| 5,504,499 | 4/1996 | Horie et al. | 345/150 |
| 5,506,946 | 4/1996 | Bar et al. | 345/431 |
| 5,508,718 | 4/1996 | Haikin | 345/150 |
| 5,509,111 | 4/1996 | Hong et al. | 354/431 |
| 5,533,186 | 7/1996 | Tanahashi et al. | 345/464 |
| 5,573,402 | 11/1996 | Gray | 434/69 |
| 5,611,028 | 3/1997 | Shibasaki et al. | 345/431 |
| 5,615,320 | 3/1997 | Lavendel | 345/431 |
| 5,630,037 | 5/1997 | Schindler | 345/431 |
| 5,659,673 | 8/1997 | Nonoshita | 345/431 |
| 5,943,059 * | 8/1999 | Satoh et al. | 345/431 |

* cited by examiner

FIG.2

| WHOLE COLOR TONE | | | |
|---|---|---|---|
| DOMAIN ID | DEGREE OF EMPHASIS | GROUP ID | COLOR COORDINATES (H,C,L) |
| 0 | 0% | 0 | |
| 1 | 50% | 0 | |
| 2 | 0% | 1 | |
| 3 | --- | -1 | H-1  C-1  L-1 |
| 4 | 0% | 2 | |
| 5 | 0% | 3 | |
| 6 | 40% | 4(=N-1) | |

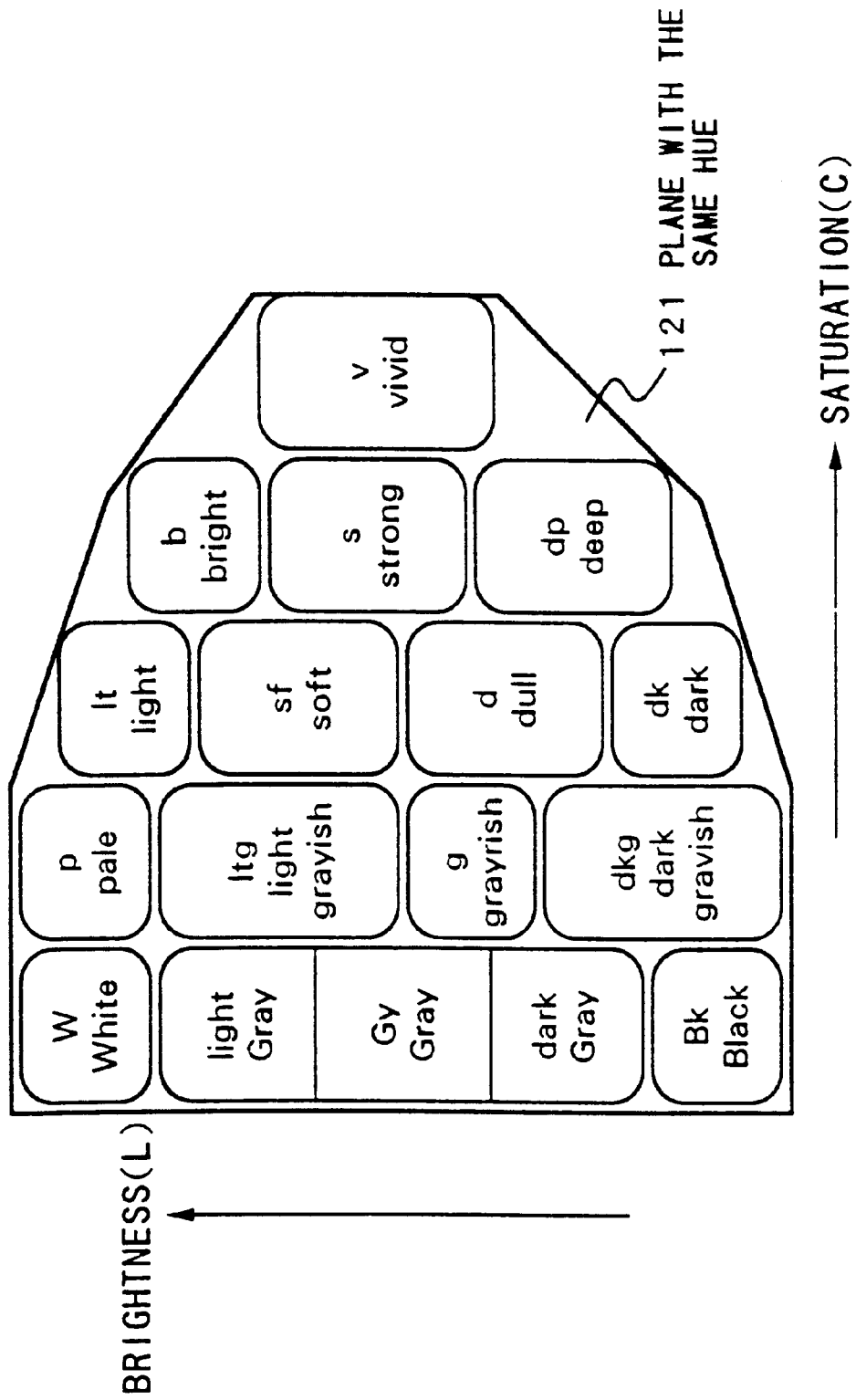

FIG.13

| TONE NAME | KEY WORD IMAGE |
|---|---|
| WHITE | CLEAN, COLD, FRESH |
| PALE | PALE, LIGHT, SLIGHT, WEAK, FAINT, PRETTY |
| LIGHT | LIGHT, TRANSPARENT, FRESH, HAPPY, CHILDISH |
| BRIGHT | BRIGHT, HEALTHY, GAY, SPLENDID |
| LIGHT GRAY | COLORLESS BRIGHT GRAY |
| LIGHT GRAYISH | LIGHT GRAYISH, QUIET, REFINED, MILD |
| SOFT | SOFT, GENTLE, DULL |
| VIVID | SMART, CLEAR, SHOWY, GAY |
| GRAY | GRAY |
| GRAYISH | GRAYISH, OPAQUE, QUIET |
| DULL | DULL, QUIET, MIDDLE TONE |
| STRONG | STRONG, TEDIOUS, DYNAMIC, TROPICAL |
| DARK GRAY | COLORLESS DARK GRAY |
| DARK GRAYISH | DARK GRAYISH, GLOOMY, HEAVY, SOLID |
| DARK | DARK, ADULT, FIRM, MATURE |
| DEEP | DEEP, DARK, SOLID, TRADITIONAL, JAPANESE |
| BLACK | HIGH-LEVEL, FORMAL, ELEGANT, TIGHT |

FIG.15

| TONE NAME | C | L |
|---|---|---|
| WHITE | 0 | 100 |
| PALE | 18 | 84 |
| LIGHT | 50 | 72 |
| BRIGHT | 82 | 58 |
| LIGHT GRAY | 0 | 75 |
| LIGHT GRAYISH | 18 | 70 |
| SOFT | 18 | 60 |
| VIVID | 100 | 50 |
| GRAY | 0 | 50 |
| GRAYISH | 18 | 40 |
| DULL | 45 | 44 |
| STRONG | 80 | 50 |
| DARK GRAY | 0 | 25 |
| DARK GRAYISH | 18 | 30 |
| DARK | 35 | 30 |
| DEEP | 68 | 35 |
| BLACK | 0 | 0 |

FIG.16

| Hp | Cp | Lp |
|---|---|---|
| 0 | 79 | 60 |
| 10 | 79 | 60 |
| 20 | 79 | 58 |
| 30 | 85 | 58 |
| 40 | 95 | 58 |
| 50 | 93 | 62 |
| 60 | 85 | 68 |
| 70 | 83 | 75 |
| 80 | 81 | 78 |
| 90 | 85 | 86 |
| 100 | 91 | 93 |
| 110 | 95 | 94 |
| 120 | 99 | 91 |
| 130 | 107 | 88 |
| 140 | 121 | 85 |
| ∫ | ∫ | ∫ |
| 350 | 83 | 62 |
| 360 | 79 | 60 |

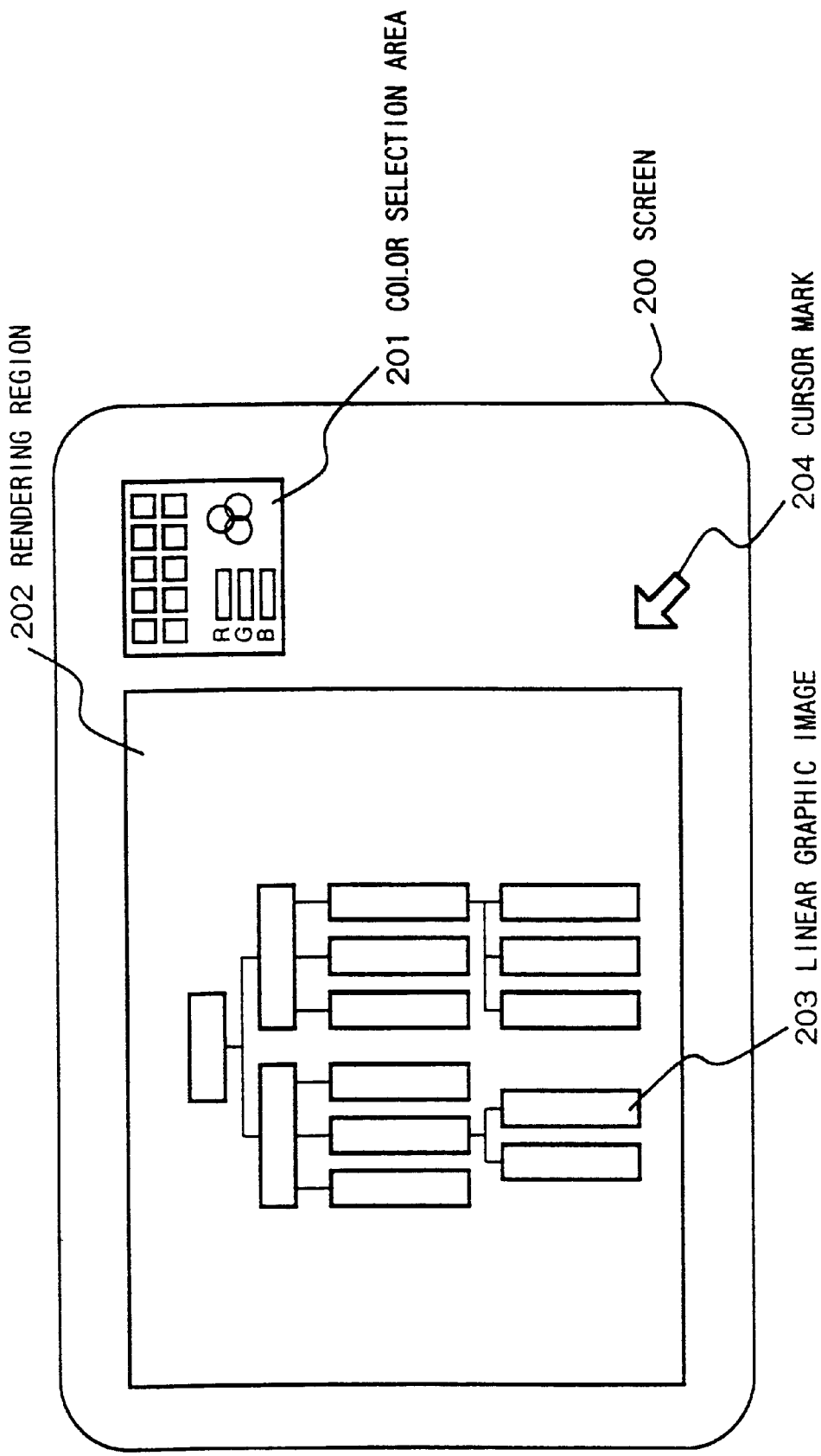

METHOD AND APPARATUS FOR COLORING SUPPORT

This application is a continuation of application Ser. No. 08/511,149, filed Aug. 4, 1995 U.S. Pat. No. 5,943,059.

BACKGROUND OF THE INVENTION

1. Field of the Invention

The present invention relates to a method of and an apparatus for coloring support, in particular for support of coloring such geometric graphic images as lines and flat nets. In the industrial sector handling two or more colors for coloring printing, such apparatus is needed for coloring on a computer display.

2. Description of the Related Art

As shown in FIG. 19, a typical coloring apparatus backed up by a computer comprises a color display 191, an operating unit 192, and an arithmetic unit 193. On a screen 200 for the color display 191, such graphic images as shown in FIG. 20 are displayed.

The operator uses a cursor mark 204 controlled by the operating unit 192 to operate a means for generating or correcting colors given in a color selection area 201 on the color display 191. This operation allows color arrangement for coloring any area on a linear graphic image 203 displayed in a rendering region 202. Typically, as the operating unit 192, highly operable mice and track balls are used. The arithmetic unit 193 assumes the tasks of operation and storage needed for coloring, input control of the operating unit 192, and control of the color display 191.

An equivalent to such coloring apparatus is installed in a color document creation system including a simple photoengraving system. Under the current environment, even the operator not familiar with photoengraving and coloring can create color documents. Under such environment, however, problems with coloring have occurred. For the quality of a document depends significantly on coloring.

For example, a chart where colors are well arranged can correctly and rapidly inform the reader of what the document argues. To the contrary, a chart where colors are arranged poorly causes the significant degradation of the quality of the document. In other words, orderly color arrangement is a key for developing a clear document.

All operators are not always familiar with orderly coloring based on knowledge and experiences, however. It is difficult for some operators to use the above color document creation system to create a clear color document where colors are well arranged in a short period.

To bridge over this difficulty, Japanese Unexamined Patent Publication (Kokai) No. Heisei 6-203118 comes up with technology for supporting coloring under the standpoint of harmonious color arrangement. The feature of the technology consists in using an arithmetic expression to generate a plurality of colors under systematization of such intuitive color tones as "light" and "loud". The color selection area 201 shown in FIG. 20 is enhanced by the addition of a means based on the expression for providing systematic tone colors and easily changing tones. The addition aims to reduce a period needed for color selection and modification, and to implement harmonious color arrangement.

The purpose of developing a color document consists in more rapidly and correctly transmitting a message to the reader than a document not colored. In other words, precise document expression requires proper color arrangement. The method disclosed in above Japanese Paten Application Laid-open No. 203118/1994 focuses on improving means for color selection and correction. The final color adoption is left to the operator's discretion. Even though a set of colors with systematized tones should be available, the operator not familiar with color processing according to the target of document expression cannot develop a clear color document.

The following gives the reasons why such linear graphic images as charts, and organizational and structural trees are colored.
(a) Visual classification of contents to be expressed
(b) Partial emphasis for clear message transmission
(c) Combination of the above two elements Effects of visual classification (a) are enhanced if such linear graphic images as organizational trees are colored suitably.

A whole organizational tree is not colored without any purposes, but different colors are assigned to such divisions as staff, business activity and engineering ones. Assigning divisions and sub-divisions consistent colors provides a clear organizational tree. Partial emphasis (b) is such that only portions to be spotlighted are colored or such portions are colored differently from the other portions.

SUMMARY OF THE INVENTION

It is an objective of the present invention to provide a method of and an apparatus for coloring support that enables even the operator unfamiliar with color arrangement to easily develop a clear, expressive, harmonious document. The method and apparatus are based on coloring according to the above three elements, and on coloring images on linear graphics developed by the operator. This means creates a set of harmonious colors from such coloring images for automatic coloring.

It is another objective of the present invention to provide a method of and an apparatus for coloring support that allows the operator to interactively enter coloring factors and efficiently carry out a job through checking the coloring process.

It is a further objective of the present invention to provide a method of and an apparatus for coloring support that prevents the use of hue that has already been applied to coloring.

According to one aspect of the invention, a coloring support apparatus comprising:

a table storage means for storing a coloring table having an emphasis column for describing the degree of color emphasis of a domain in a linear graphic image to be colored, and a color coordinate column for describing a color coordinate value in any color space in said domain to be colored for each image element constituting said linear graphic image, a whole color tone column for describing the impression of coloring for said linear graphic image;

a color number determination means for determining the number of colors to be produced in said linear graphic image according to said coloring table stored in said table storage means;

a hue determination means for determining hue values according to the number of colors obtained by said color number determination means for description in said color coordinate column in said coloring table;

a reference coordinate determination means for determining the tone, saturation and brightness of a color corresponding to the impression of coloring described in said whole color tone column in said coloring table as the reference point on a plane with the same hue;

a color generation means for determining the saturation and brightness values of the hue of colors to be generated on said linear graphic image according to coordinates of said plane with the same hue at said reference point obtained by said reference coordinate determination means for description in said color coordinate column in said coloring table; and a coloring means for referencing said coloring table covering a certain value in said each column to determine color coordinates for said color coordinate column and color said linear graphic image.

In the preferred construction, the coloring table stored in said table storage means includes a domain ID column for describing domain IDs to identify domains in graphic elements constituting said linear graphic image.

In the preferred construction, the color generation means moves said reference point on said plane with the same hue obtained by said reference coordinate determination means in the direction of emphasis predefined on said plane with the same hue according to the degree of emphasis described at said emphasis column in said coloring table stored in said table storage means to determine the saturation and brightness values of the hue of colors to be generated on said linear graphic image according to coordinates of said moved point on said plane with the same hue for description in said color coordinate column in said coloring table.

Also, the coloring table stored in said table storage means includes a group ID column for describing a group ID used to identify a domain to be assigned the same hue color; and said hue determination means assigns the same hue value to domains for which the same group ID is described in said group ID column to describe hue values in said color coordinate column in said coloring table.

Also, the coloring table stored in said table storage means includes said group ID column for describing said group ID used to identify a domain to be assigned the same hue color; and the hue determination means assigns the same hue value to domains for which the same group ID is described in said group ID column to describe hue values in said color coordinate column in said coloring table.

In the above-mentioned construction, the coloring table stored in said table storage means describes a group ID used to identify domains to be assigned the same hue color and includes a group ID column for describing a fixed color ID for forced color specification; and the hue determination means determines hue values different from those of colors forcibly specified by said forced color ID according to the number of colors obtained by said color number determination means, and assigns the same hue value to domains for which the same group ID is described in said group ID column to describe hue values at said color coordinate column in said coloring table.

In the above-mentioned construction, the coloring table stored in said table storage means describes group IDs for identifying domains to be assigned the same hue value, and includes said group ID column for describing said fixed color ID for forced color specification; and the hue determination means determines hue values different from those of colors forcibly specified by said fixed color ID according to the number of colors obtained by said color number determination means, and assigns the same hue value to domains for which the same group ID is described in said group ID column to describe hue values in said color coordinate column in said coloring table.

According to another aspect of the invention, a coloring support apparatus comprising:

a table storage means for storing a coloring table having an emphasis column for describing the degree of color emphasis of a domain in a linear graphic image to be colored, and a color coordinate column for describing a color coordinate value in any color space in said domain to be colored for each image element constituting said linear graphic image, a whole color tone column for describing the impression of coloring for said linear graphic image;

a color number determination means for determining the number of colors to be produced in said linear graphic image according to said coloring table stored in said table storage means;

a hue determination means for determining hue values according to the number of colors obtained by said color number determination means for description in said color coordinate column in said coloring table;

a reference coordinate determination means for determining the tone, saturation and brightness of a color corresponding to the impression of coloring described in said whole color tone column in said coloring table as the reference point on a plane with the same hue;

a color generation means for determining the saturation and brightness values of the hue of colors to be generated on said linear graphic image according to coordinates of said plane with the same hue at said reference point obtained by said reference coordinate determination means for description in said color coordinate column in said coloring table;

a first input means for specifying said domain in said linear graphic image to be colored to set each column in said coloring table stored in said table storage means;

a second input means for specifying a domain in said linear graphic image to be subjected to color emphasis, and the degree of emphasis in said domain to enter any value to an emphasis column in said coloring table stored in said table storage means;

a third input means for specifying the whole color impression of said linear graphic image by said given key word to enter any value to said whole color tone column in said coloring table stored in said table storage means; and a coloring means for referencing said coloring table covering certain values in each column to determine color coordinates in said color coordinate column and color said linear graphic image.

In the preferred construction, the coloring table stored in said table storage means includes a domain ID column for describing domain IDs to identify domains in graphic elements constituting said linear graphic image.

Also, the color generation means moves said reference point on said plane with the same hue obtained by said reference coordinate determination means in the direction of emphasis predefined on said plane with the same hue according to the degree of emphasis described at said emphasis column in said coloring table stored in said table storage means to determine the saturation and brightness values of the hue of colors to be generated on said linear graphic image according to coordinates of said moved point on said plane with the same hue for description in said color coordinate column in said coloring table.

In the above-mentioned construction, the coloring table stored in said table storage means includes a group ID column for describing a group ID used to identify a domain to be assigned the same hue color;

the hue determination means assigns the same hue value to domains for which the same group ID is described in said group ID column to describe hue values in said color coordinate column in said coloring table;

the first input means allocates said group ID column in said coloring table stored in said table storage means; and the coloring support apparatus further comprises a fourth input means for specifying domains in said linear graphic image to be assigned the same color to enter any value to said group ID column stored in said table storage means.

In the above-mentioned construction, the coloring table stored in said table storage means includes said group ID column for describing said group ID used to identify a domain to be assigned the same hue color;

said hue determination means assigns the same hue value to domains for which the same group ID is described in said group ID column to describe hue values in said color coordinate column in said coloring table;

said first input means allocates said group ID column in said coloring table stored in said table storage means; and said coloring support apparatus further comprises a fourth input means for specifying domains in said linear graphic image to be assigned the same color to enter any value to said group ID column stored in said table storage means.

In the above-mentioned construction, the coloring table stored in said table storage means describes a group ID used to identify domains to be assigned the same hue color and includes a group ID column for describing a fixed color ID for forced color specification;

said hue determination means determines hue values different from those of colors forcibly specified by said forced color ID according to the number of colors obtained by said color number determination means, and assigns the same hue value to domains for which the same group ID is described in said group ID column to describe hue values at said color coordinate column in said coloring table; and said coloring support apparatus further comprises a fifth input means for describing said fixed color ID indicating any fixed color in said group ID column corresponding to a domain for which a color is to be forcibly specified in said coloring table stored in said storage means and for describing the hue value of said fixed color in said color coordinate column corresponding to said domain.

Also, the coloring table stored in said table storage means describes group IDs for identifying domains to be assigned the same hue value, and includes said group ID column for describing said fixed color ID for forced color specification;

the hue determination means determines hue values different from those of colors forcibly specified by said fixed color ID according to the number of colors obtained by said color number determination means, and assigns the same hue value to domains for which same group ID is described in said group ID column to describe hue values in said color coordinate column in said coloring table; and the coloring support apparatus further comprises a fifth input means for describing said fixed color ID indicating any fixed color in said group ID column corresponding to a domain for which a color is to be forcibly specified in said coloring table stored in said storage means and for describing the hue value of said fixed color in said color coordinate column corresponding to said domain.

According to a further aspect of the invention, a coloring support method comprising:

a step for entering the degree of color emphasis of a domain in a linear graphic image to be colored and the color coordinate values of any color space in said domain to be colored for each graphic element constituting said linear graphic image, as well as the impression of whole coloring in said linear graphic image by a certain predefined key word;

a step for calculating the saturation and brightness values of the hue of colors to be produced on said linear graphic image according to said entered emphasis degree, color coordinate value and key word; and a step for coloring said linear graphic image according to said calculated hue saturation and brightness values.

In this case, the each value is entered in said step for specifying the degree of emphasis, a color coordinate value and a key word for a linear graphic image, and a domain to be assigned the same hue color is further specified.

In the above-mentioned construction, the each value is entered in said step for specifying the degree of emphasis, a color coordinate value and a key word for a linear graphic image, and a domain for forced color specification and a color to be assigned to said domain are further specified.

In this case, the each value is entered in said step for specifying the degree of emphasis, a color coordinate value and a key word for a linear graphic image, and a domain to be assigned the same hue color, domain for forced color specification and a color to be assigned to said domain are further specified.

The other objectives, features and effects of the present invention will be clarified from the following details description.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 provides a coloring table that sets out coloring policies for graphic elements constituting a linear graphic image.

FIG. 12 provides the names of tones on a plane with the same hue, and their positions.

FIG. 13 provides relationships between adjectives (key words) for expressing tones and colors.

FIG. 15 provides a table which indicating the saturation and brightness of tones on the reference plane of the same hue.

FIG. 16 provides a table which indicating the highest saturation and the brightness of colors with the saturation in the representative hue.

FIG. 20 an example screen configuration on a color display on the coloring apparatus based on FIG. 19.

DESCRIPTION OF THE PREFERRED EMBODIMENTS

The following provides a detailed description of the preferred embodiments of the present invention on the basis of the drawings.

Figure 1:
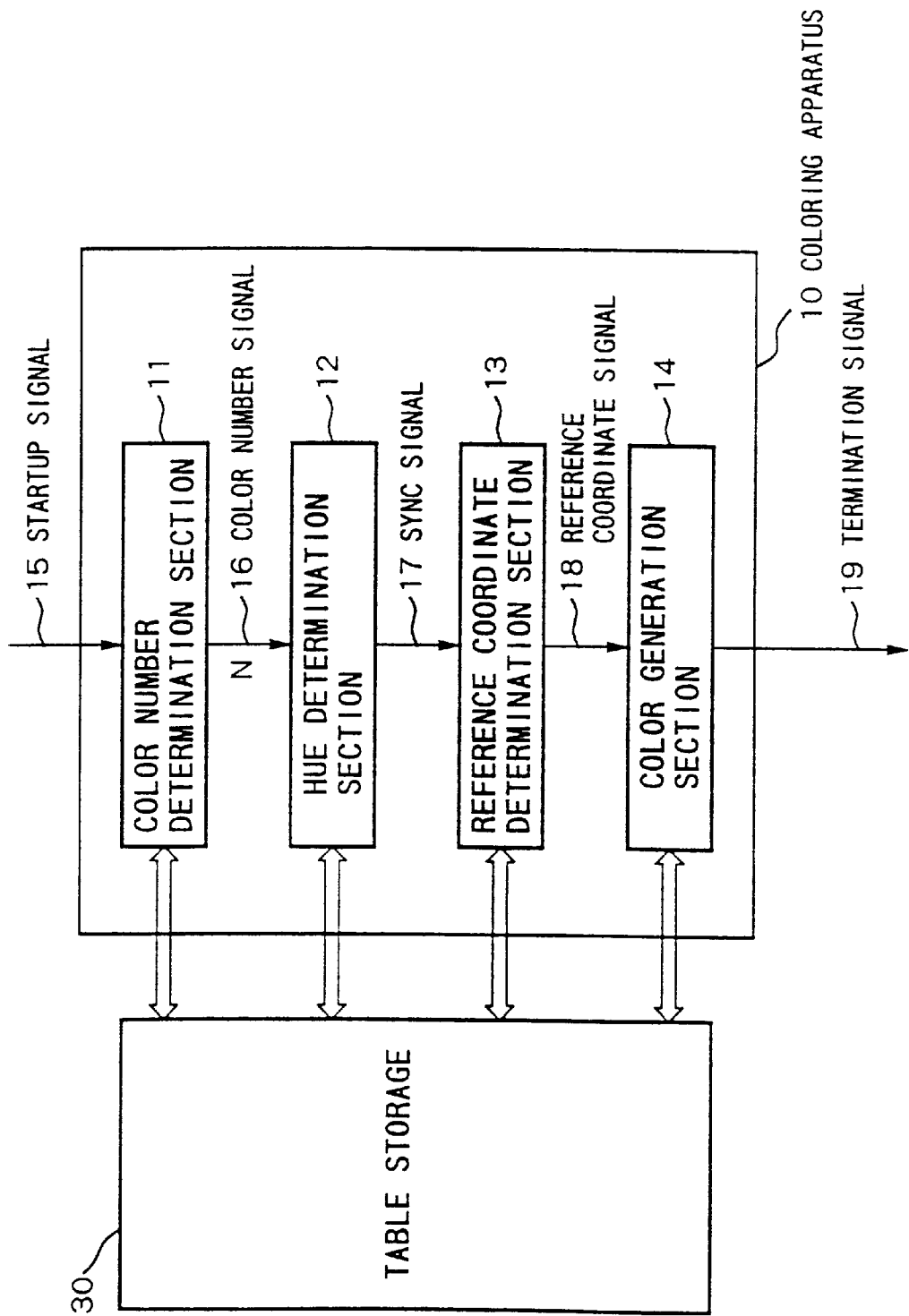
FIG. 1 provides a block diagram that illustrates the configuration of the first preferred embodiment of the present invention.

FIG. 1 provides a block diagram that depicts the first preferred embodiment of the present invention. A coloring support apparatus of the preferred embodiment resorts to data covered in a coloring table 20 in FIG. 2 stored in a table storage 30. The coloring support apparatus determines colors in regions constituting linear graphic images under the standpoint of color harmony to complete a color coordinate column in the coloring table 20.

The following gives a detailed description of the coloring table 20.

Such edge graphic images in a document as charts, and organizational and structural trees can be expressed by a combination of geometric patterns including rectangles, ellipses, straight lines, closed polygons and closed curves. Those graphic elements are hereinafter called "domains". The task of coloring a linear graphic image is to determine color assignment to the domains. The coloring support apparatus 10 receives coloring concepts on how the domains are to be colored. The coloring table 20 shown in FIG. 2 provides information on those coloring concepts.

A whole color tone column 21 specifies how to color a whole edge pattern by color tones. FIG. 12 shows the positions of tones on a plane with the same hue in the three-dimensional color system in FIG. 11 with respect to the X axis for saturation and the Y axis for brightness. FIG. 13 provides relationships between tone names 131 and key words (adjectives for color expression). The whole color tone column 21 in the coloring table 20 covers tone names 131 or key words 132 in FIG. 13.

A domain ID column 22 provides information for identifying domains to be colored. In the example of FIG. 2, numbers are used to identify domains.

An emphasis column 23 provides information on the degree of domain color emphasis. The emphasis column 23 can be used to implement partial emphasis for clear message transmission as a purpose of coloring a document. If the degree of emphasis is 0 percent, the domain is colored by a tone covered in the whole color tone column 21. If the degree of emphasis is not 0 percent, the domain is colored by a tone different from the one specified in the whole color tone column 21 according to the value of assumed emphasis specification. Relationships between the degree of emphasis and changes in tones will be described in detail later.

Assigning two or more domains, the same color requires that the same value be specified for IDs (numbers and symbols) in a group ID column 24. In the example of FIG. 2, the group IDs for domains whose domain ID columns 22 are 0 and 1 are the same. Thus, such domains are assigned the same color. If emphasis is specified for domains having the same group ID, the domains are assigned the same color, followed by changes only in tones through the above mentioned emphasis processing. The assignment of the same color to two or more domains by group IDs is applicable to the implementation of visual classification of expressed items as a purpose of coloring a document.

A fixed color ID can be set as a special ID in the group ID column 24. The fixed color ID is used to forcibly specify a color for a domain. The strict specification of a color, for example, for a logotype involves the entry of a fixed color ID in the group ID column 24 and the designation of the color in the color coordinate column 25 described later. The domain is colored according to specification irrespective of the set domain ID. To distinguish between a fixed color ID to be described in the group ID column 24 and the typical group ID, one ID can be described by a positive number and the other by a negative number. In FIG. 2, negative group ID (−1) is given to domain 3 with fixed color coordinates $H_{-1}$, $C_{-1}$, $L_{-1}$, for example.

The color coordinate column 25 is used to describe coordinates of a color to be applied to the domain. It is blank unless a fixed color ID is specified in the group ID column 24. Color coordinates to be selected can be specified by:

(1) RGB color system notation for expressing brightness information on a fluorescent screen for a color display;

(2) HCL color system notation for expressing a color by hue, saturation and brightness;

(3) XYZ notation recommended by the International Illumination Committee (CIE) or CIE color system notation including $L^*a^*b^*/L^*u^*v^*$ notation.

Figure 11:
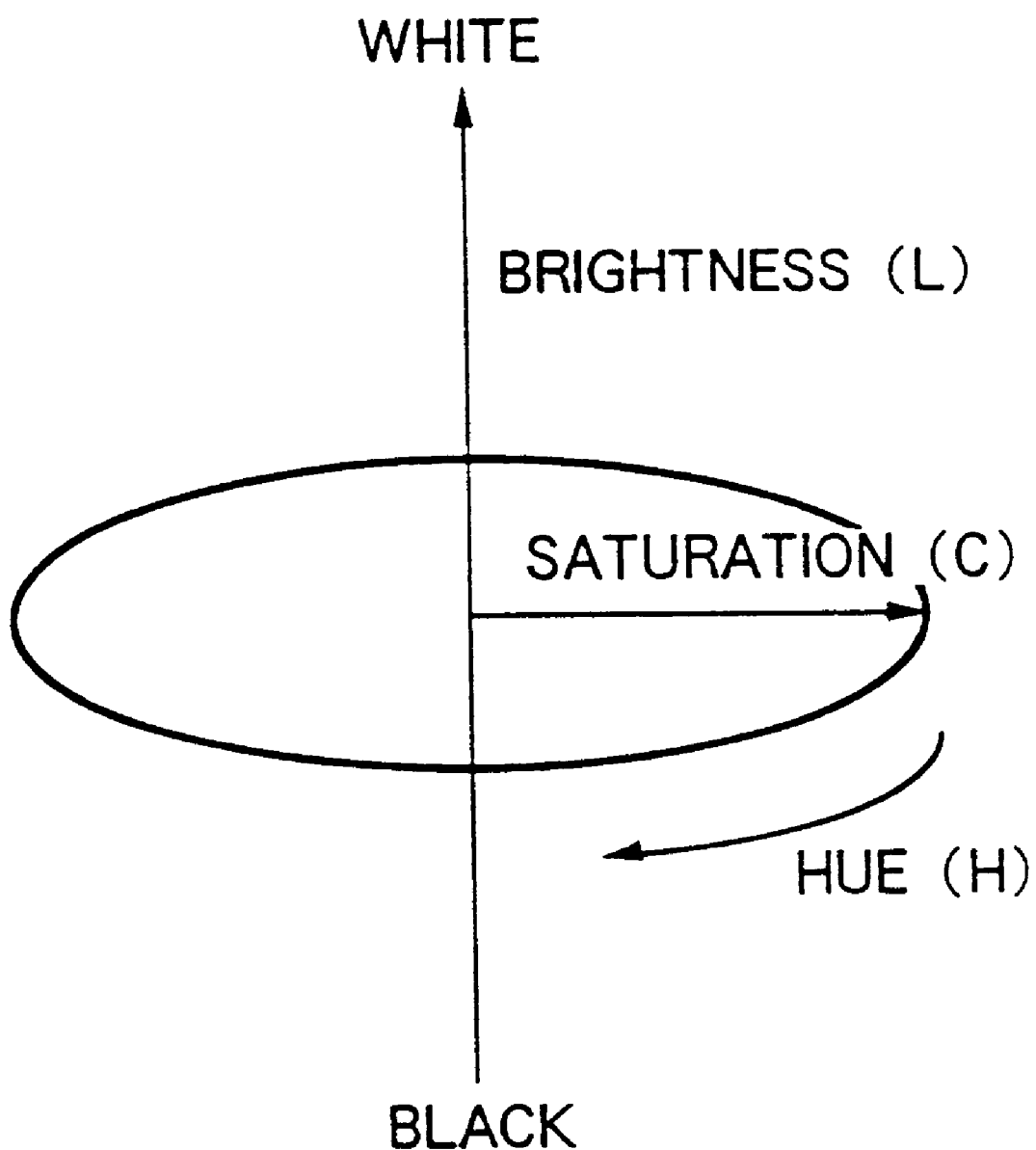
FIG. 11 provides a three-dimensional HCL color system.

As shown in FIG. 11, the preferred embodiments of the present invention are based on the HCL color system notation. To translate the HCL color system into another color system, the known method and expression can be used which are covered in Japanese Unexamined Patent Publication (Kokai) No. Heisei 6-203118 and a document, "Industrial Color Science" (written by Naya and issued by Asakura Verlag).

The table storage 30 stores the coloring table 20 arranged as shown above.

Upon the input of a startup signal 15, a color number determination section 11 retrieves the group ID column 24 on the coloring table 20 stored in the table storage 30. The color number determination section 11 determines the number of colors through identifying the number of different IDs, outputting the determined color number as a color number signal 16. As the domains for which the same ID is described in the group ID column 24 are assigned the same color, the number of different IDs is equal to the number of colors produced.

A hue determination section 12 receives the color number signal 16 from the color number determination section 11. It generates a hue value array Hi for the color number given by the color number signal 16 by operation with an expression (1) described later. Then, generated hue value array Hi is cataloged to the color coordinate column 25 in the coloring table 20. During this cataloging, the domains for which the same ID is described in the group ID column 24 are assigned the same hue value. Upon the termination of cataloging hue values to all color coordinate columns 25 in the coloring table 20, a sync signal 17 is output.

A reference coordinate determination section 13 receives the sync signal 17 from the hue determination section 12, and generates a reference coordinate signal 18. The reference coordinate signal 18 is a coordinate signal that indicates coordinates corresponding to the tone name 131 or the key word 132. The tone name or the key word are described in coordinates 142 for saturation C and brightness L on the reference plane with the same hue 141 as the whole color tone column 21 in the coloring table 20 stored in the table storage 30. The reference coordinate determination section 13 is provided with a retrieval table and a retrieval means for the table, for example, shown in FIG. 15 to identify coordinates 142 from the tone name 131 or the key word 132.

A color generation section 14 receives the reference coordinate signal 18 from the reference coordinate determination section 13. An expression (4) described later is used to calculate saturation $C_i$ and brightness $L_i$ at the hue value $H_i$ described in all the color coordinate columns 25 on the coloring table 20 stored in the table storage 30. Thus, the color coordinate column 25 is provided with a complete set of coordinate values under the HCL color system. Coordinate values given by the reference coordinate signal 18 are assigned to expression (2) described later, with the resulting coordinates used for operations in expression (4) as coordinate values for (C', L'). A coordinate value of ($C_p$, $L_p$) provides the saturation and brightness of a pure color at the hue $H_i$. The coordinate value is determined from a pure color table as shown in FIG. 16 preset in the color generation section 14 and by interpolation with expression (5) described later.

Upon the termination of cataloging saturation and brightness to all color coordinate columns 27 in the coloring table 20, a termination signal is output. If numbers described in the domain ID column 22 are arranged regularly, for example, in ascending order in the coloring table 20 of FIG. 2 and can be determined easily without any efforts, the domain ID column 22 may be deleted from the coloring table 20.

Figure 10:
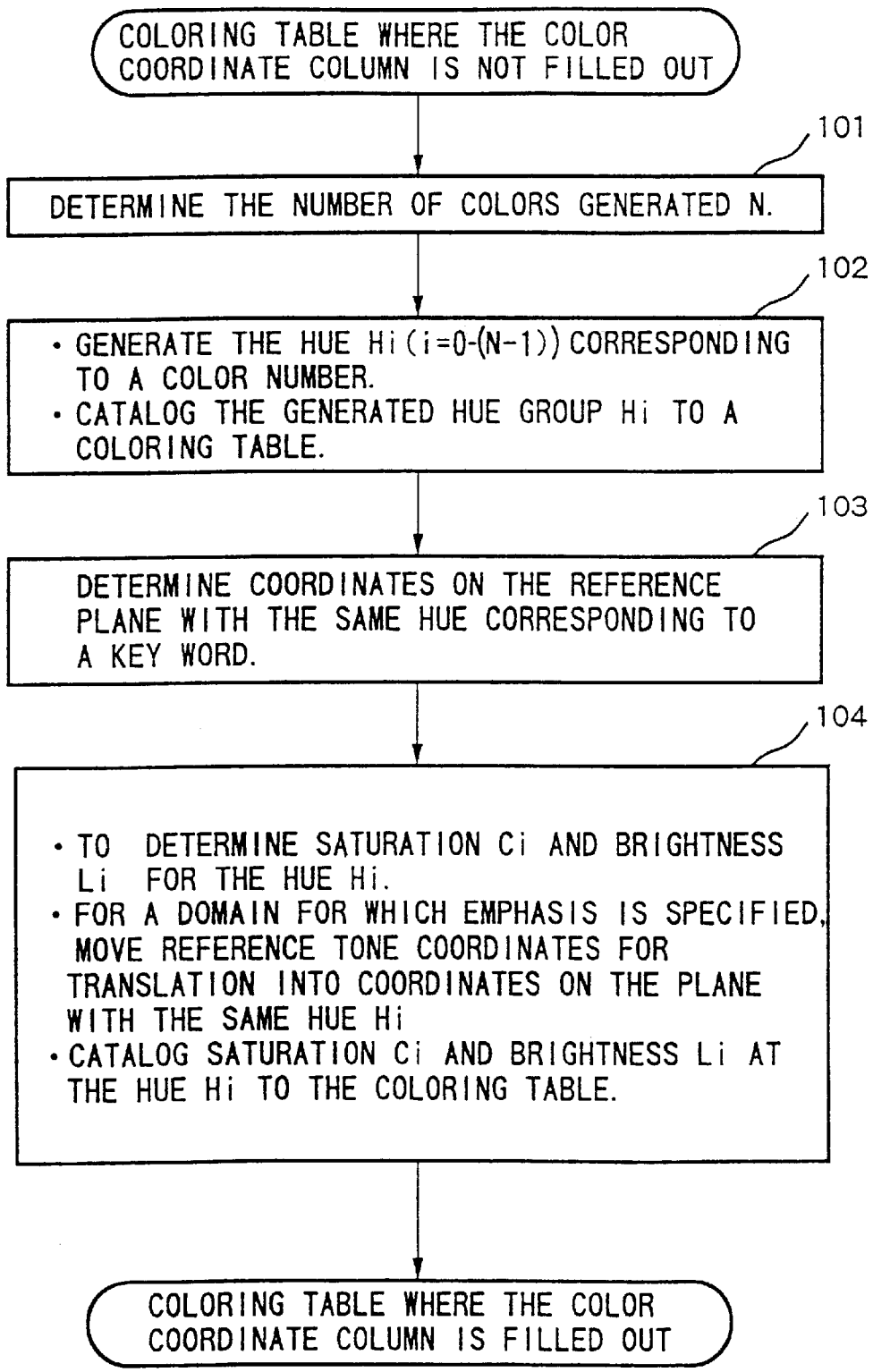
FIG. 10 provides a procedure for using information covered in the coloring table to develop colors of graphic elements constituting a linear graphic image.

The following explains the procedure of operation in the preferred embodiment according to FIG. 10. The operation allows the generation of harmonious colors for domains in a linear graphic pattern from the coloring table 20 where the color coordinate column 25 is not filled in. Further, through the operation, the color coordinate column is provided with a complete set of color coordinates.

A first step 101 is to determine a required color number N. For this determination, the group ID column 24 in the coloring table in FIG. 2 is retrieved to identify the number of different IDs except for the fixed color ID. For the domains for which the same ID is described in the group ID column are assigned the same color, and the number of different IDs is equal to the number of colors produced.

A second step 102 is to determine the hue corresponding to the color number N fixed in the first step 101. The determination of hue $H_i$ (i=0, 1, . . . , N−1) follows expression (1).

$$H_i = (R/N)i + a \qquad (1)$$

In the above expression, "a" stands for the hue of the first color. "R" stands for the range of hue numbers. If "R" is equal to 360 degrees, the hue ring is divided equally into N components. For example, setting the "R" value at about 90 degrees and changing "a" enable the generation of colors limited to cold or warm hue. For a domain for which the fixed color ID is described in the group ID column, the values of "R" and "a" in expression (1) must be adjusted so that hue described in the color coordinate column 25 for the domain does not appear. Fundamentally, "a" may be any value. By some "a" values, however, resulting hue values $H_i$ may be out of the range of $0 \leq H_i < 360$ (degree). In such a case, a value of 360 should be added/subtracted to/from $H_i$ to satisfy the requirement. N hue values $H_i$ created in the above way are cataloged to the color coordinate column 25 in the coloring table. The domains for which the same ID is described in the group ID column are assigned the same hue value.

Figure 14:
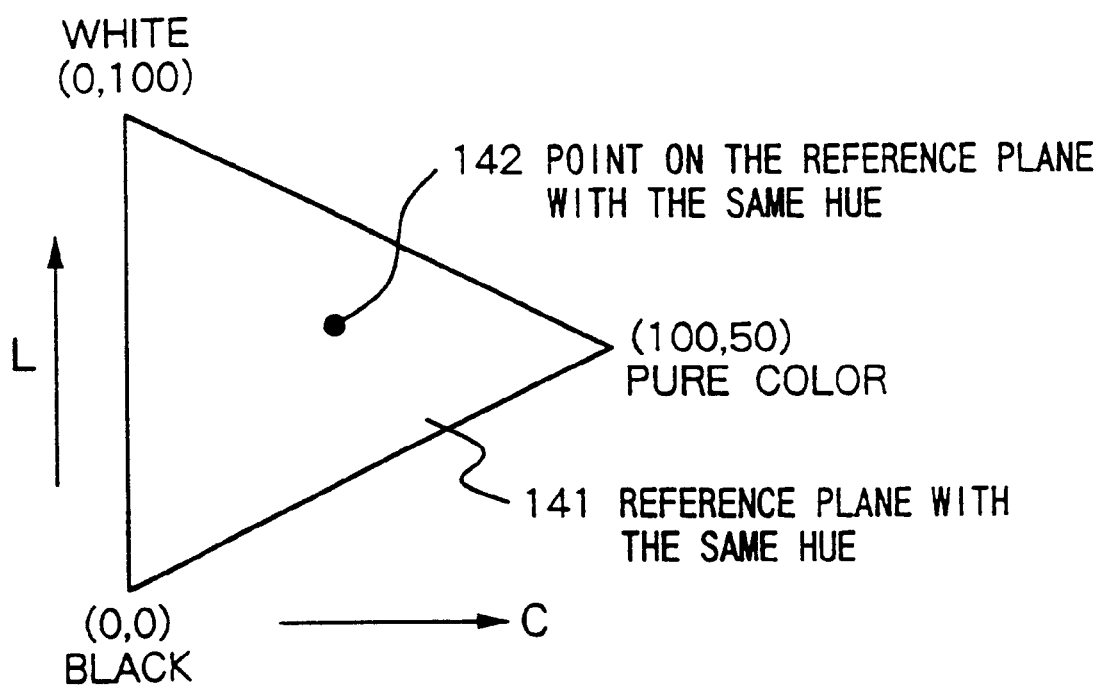
FIG. 14 provides the virtual reference plane with the same hue with respect to fixed pure colors.

A third step 103 is to determine coordinates 142 of the point corresponding to the tone name 131 or the key word 132 described in the whole color tone column 21 on the reference plane with the same hue 141 shown in FIG. 14. The reference plane with the same hue refers to a virtual plane with the same hue on the assumption that all colors with the same hue exist inside the triangle whose vertices are (100, 50) for the pure color with the highest saturation, (0, 0) for black, and (0, 100) for white. Coordinates of the pure color are not always limited to (100, 50), however.

The table shown in FIG. 15 is used to replace a tone name described in the whole color tone column with coordinates 142 on the reference place with the same hue 141. FIG. 15 provides an example table where tone names are correlated in advance with coordinates on the reference plane with the same hue 141. Retrieving the table of FIG. 15 by a tone name on the whole color tone column allows the easy determination of coordinates 142 on the reference place with the same hue. Even though key words (adjectives for color expression) are described in the whole color tone column 21, coordinates 142 on the reference plane with the same hue can be identified if such a table as shown in FIG. 15 is developed.

The third step 103 is independent of the first step 101 and the second step 102. Thus, the third step can be executed in any timing prior to the fourth step described later.

Figure 17:
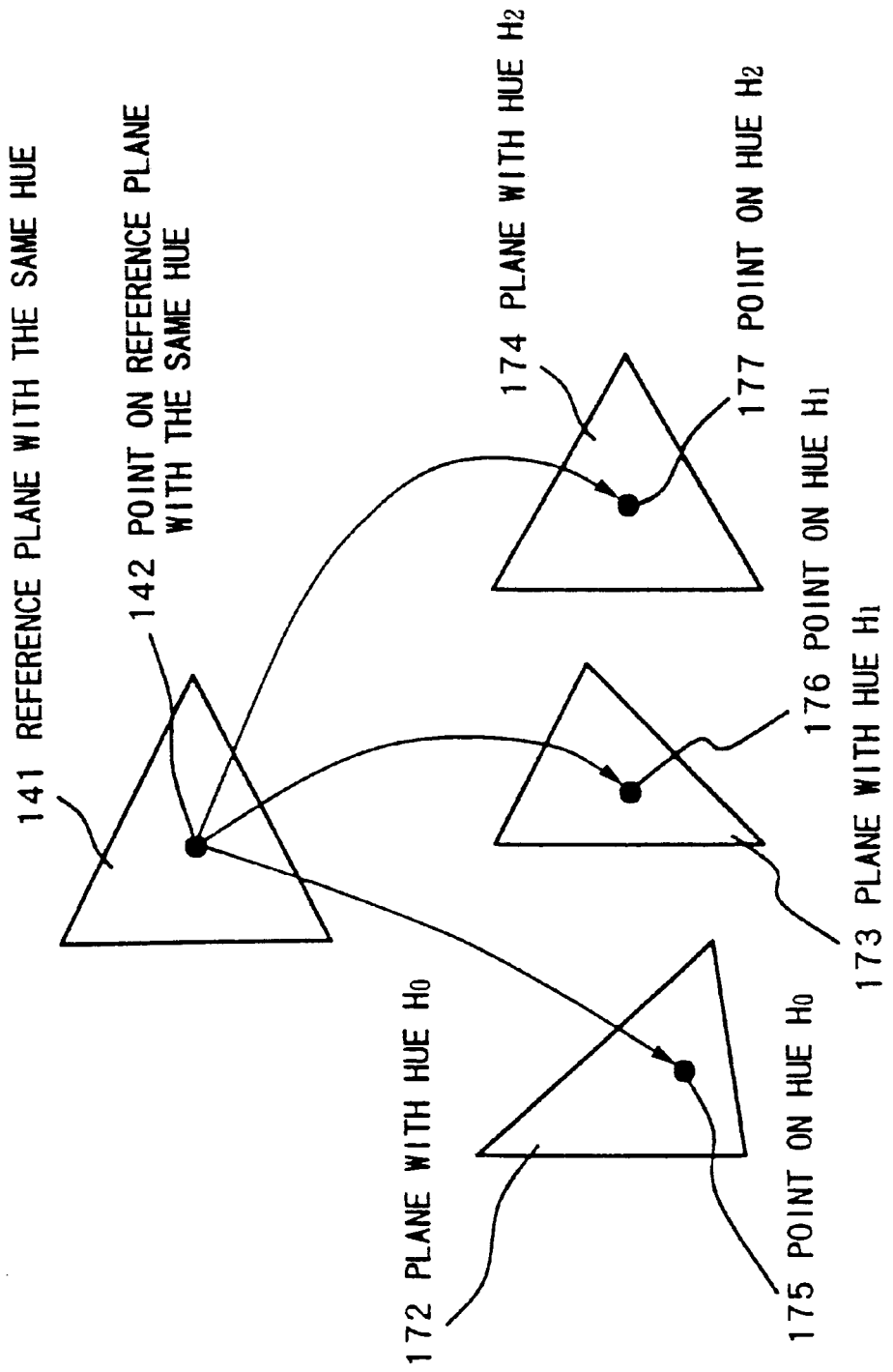
FIG. 17 illustrates the translation of a point on the reference plane with the same hue into the corresponding point on a plane with the other same hue.
Figure 18:
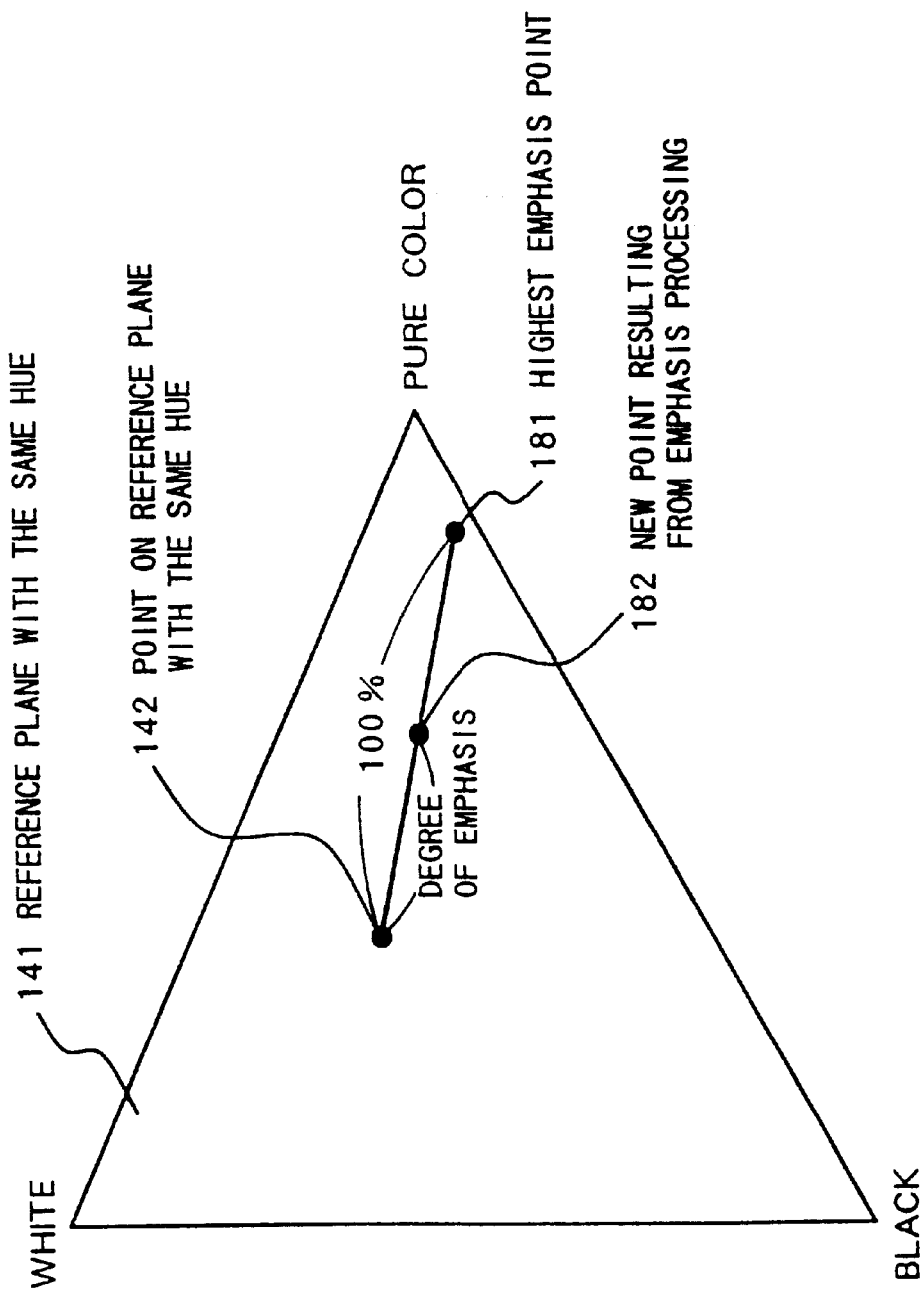
FIG. 18 illustrates the movement of a point on the reference place with the same hue to the direction of the most emphasized point according to the degree of emphasis.

The following explains a fourth step 104 according to FIG. 17. FIG. 17 provides an example where the color number determined by the first step 101 is 3 and, thus, three colors are produced. The fourth step translates the point 142 on the reference plane with the same hue determined by the third step 103 into points 175 to 177 on the planes with hue $H_i$ 172 to 174 determined by the second step 102. Thus, saturation $C_i$ and brightness $L_i$ for hue $H_i$ can be determined. This does not apply to hue for which the degree of emphasis in the emphasis column 23 in the coloring table is not 0 percent, however. As shown in FIG. 18, a point 182 where the point 142 on the reference plane with the same hue is reflected in a point 181 of the highest emphasis is translated into a point on the plane with the same hue in a hue group Hi. The point 181 of the highest emphasis refers to a point on the reference plane with the same hue on the assumption that the degree of emphasis is 100 percent.

Generally speaking, the domain to be emphasized is assigned a color that provides higher saturation and deeper impression than the other domains. Therefore, the point of the highest emphasis is defined as the clearest color (pure color) or a color providing somewhat lower brightness than the pure color.

Expression (2) is used to determine the point 182 where the point 142 on the reference plane with the same hue is reflected in the point of the highest emphasis 181, concerning the domain where the emphasis column 23 in the coloring table 20 is not 0 percent.

$$C' = \beta \cdot C_m + (1-\beta) \cdot C$$
$$L' = \beta \cdot L_m + (1-\beta) \cdot L \quad (2)$$

In expression (2), coordinates (C, L) provide the saturation and brightness of the point 142 on the reference plane with the same hue determined by the third step 103. Coordinates ($C_m$, $L_m$) provide the saturation and brightness of the point 181 of the highest emphasis. "β" provides the degree of emphasis (percentage) described in the emphasis column 24 divided by 100 to become the range of 0 to 1. Calculations (C', L') provide the saturation and brightness of the point 182 reflecting the emphasis.

Expression (3) is used to translate the point 142 on the reference plane with the same hue or the point 182 reflecting the highest emphasis into points 175 to 177 on the plane with the same hue value Hi.

$$Ci = C_p C'/C_g$$
$$Li = (L_p - L_g) C'/C_g + L' \quad (3)$$

In expression (3), coordinates ($C_g$, $L_g$) provide the saturation and brightness of the pure color on the reference plane with the same hue, being (100, 50) (see FIG. 14). Hence, expression (3) can be rewritten to expression (4).

$$Ci = C_p C'/100$$
$$Li = (L_p - 50) C'/50 + L' \quad (4)$$

In expression (4), coordinates (C', L') refer to the point 142 on the reference plane with the same hue. Coordinates of the point identified by the third step 103, or coordinates of the point 182 reflecting the point of the highest emphasis 181 are used. Calculations ($C_i$, $L_i$) indicate the points 175 to 177 on the plane with the same hue value $H_i$. Coordinates ($C_p$, $L_p$) provide the saturation and brightness of the pure color planes 172 to 174 with the same hue value $H_i$. These values can be determined by developing such a table (pure color table) as shown in FIG. 16. The pure color table covers the saturation and brightness of the pure color on about 36 representative hue values $H_j$ (j=0, 1, 2, 3, . . . ). The saturation $C_p$ and brightness $L_p$ of the pure color at any hue value $H_i$ can be determined by pure color table value interpolation. Expression (5) provides an example of interpolation.

$$C_p = \gamma \cdot C_{j+1} + (1-\gamma) \cdot C_j$$
$$C_p = \gamma \cdot C_{j+1} + (1-\gamma) \cdot C_j$$
$$\gamma = (H_i - H_j)/(H_{j+1} - H_j) \quad (5)$$

In expression (5), the saturation and brightness of the pure color at representative hue $H_j$ and $H_{j+1}$ that satisfies requirements of $H_j \leq H_i < H_{j+1}$ in the pure color table are ($C_j$, $L_j$) and ($C_{j+1}$, $L_{j+1}$), respectively.

Cataloging saturation $C_i$ and brightness $L_i$ created by the above procedure to the color coordinate column 25 in the coloring table allows the color coordinate column 25 to be developed as complete coordinates in the HCL color system.

The following explains the second preferred embodiment of the present invention. The preferred embodiment deals with a coloring table where IDs described in the group ID column 24 in the coloring table 20 are enhanced by the addition of an ID indicating forced color specification (hereinafter called the fixed color ID). The addition of the fixed color ID can prevent the occurrence of a color with already used hue. The hardware configuration is the same as for the first preferred embodiment (FIG. 1) with the exception of the following points.

The color number determination section 11 calculates the number of different IDs except fixed color IDs at the group ID column 24 in the coloring table 20 stored in the table storage 30 to determine the number of colors produced.

The hue determination section 12 adjusts values of "R" and "a" in expression (1) so that the hue described at the color coordinate column 27 in a domain for which the fixed color ID is cataloged at the coloring table 20 stored in the table storage 30 does not appear.

The color generation section 14 does not determine new saturation and brightness on the color coordinate column 25 for a domain for which the fixed color ID is described at the group ID column 24 in the coloring table 20 stored in the table storage 30. The reference coordinate determination section 13 and the table storage 30 are the same as for the first preferred embodiment.

Figure 3:
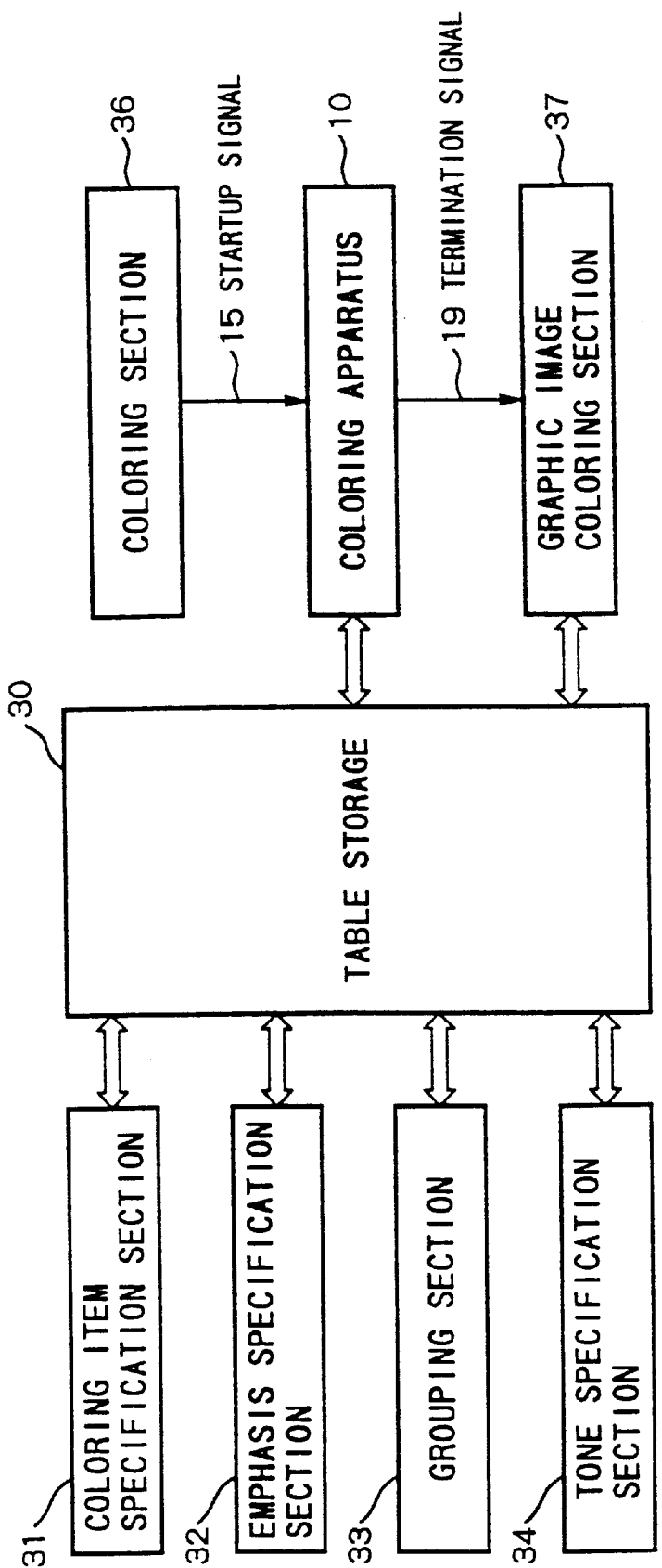
FIG. 3 provides a block diagram that illustrates the configuration of the third preferred embodiment of the present invention.

The following explains the third preferred embodiment of the present invention. FIG. 3 provides the block diagram that indicates the configuration of the third preferred embodiment of the present invention.

Figure 19:
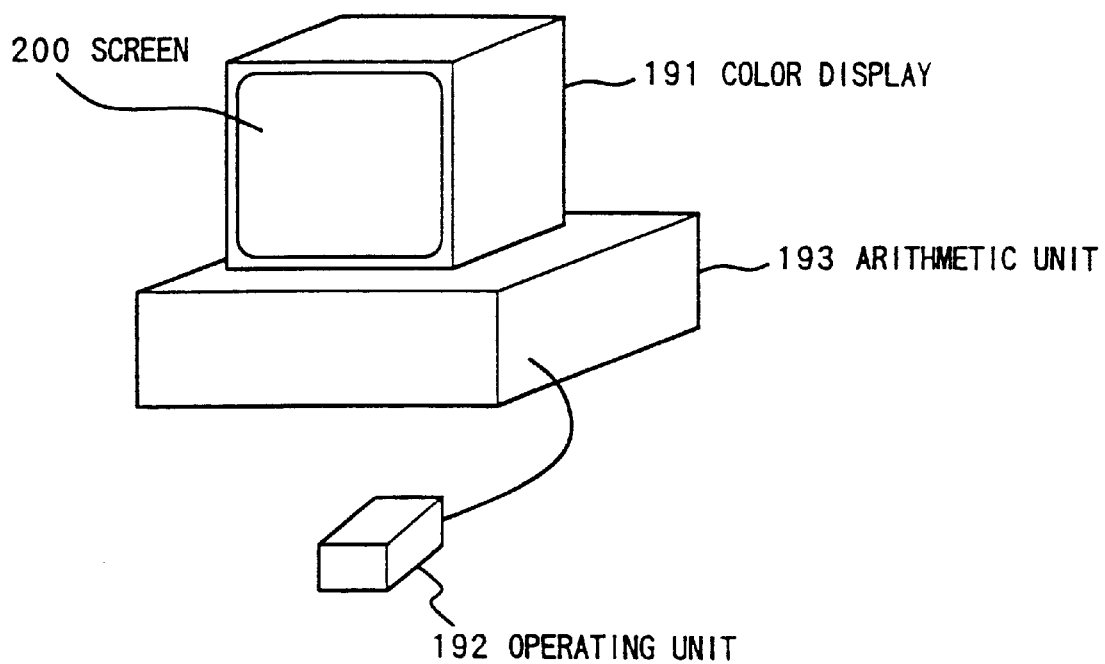
FIG. 19 provides the standard hardware configuration of the coloring apparatus based on prior art.

The preferred embodiment is implemented as the apparatus shown in FIG. 19. Such a screen as shown in FIG. 20 is displayed on the color display 191. In FIG. 20, the linear graphic image 203 is displayed in the rendering region 202. In such graphic elements constituting the linear graphic image 203 as rectangles, ellipses, straight lines, closed polygons and closed curves, information other than colors (for example, layout information on a circle including center coordinates and radius) is assumed to be known. The cursor mark 204 is interconnected to the operating unit 192 in FIG. 19, allowing the specification of a domain for the linear graphic image 203. In the preferred embodiment, the operator can interactively determine coloring concepts and also color the linear graphic image.

As shown in FIG. 3, the table storage 30 of the preferred embodiment stores the coloring table 20 shown in FIG. 2.

Figure 5:
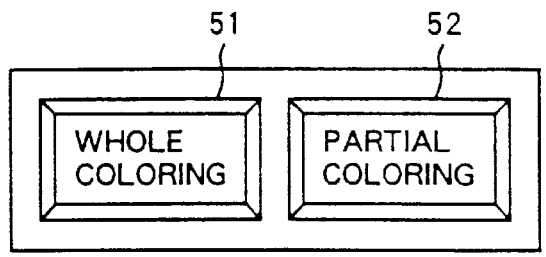
FIG. 5 shows an example interface for specifying an item to be colored in the third preferred embodiment of the present invention.

A coloring item specification section 31 for specifying an item to be colored comprises an interface for specifying a domain in the linear graphic image 203 to be colored by the operating unit 192. The coloring table 20 in the table storage 30 is allocated the domain ID column 22, the emphasis column 23, the group ID column 24, and the color coordinate column 25 needed for the specified domain. IDs in the domain ID column 22 in the coloring table 20 are correlated with the domains to be colored in the linear graphic image 203. For example, as shown in FIG. 5, the interface for the coloring item specification section 31 for specifying an item to be colored is implemented as two switches 51 and 52. The two switches 51 and 52 are specified by the operating unit for selection. If the switch 51 for specifying whole coloring is valid, all domains in the linear graphic image are specified as items to be colored. If the switch 52 for specifying partial coloring is valid, the operating unit 192 is used to specify domains in the linear graphic image to be colored.

Figure 6:
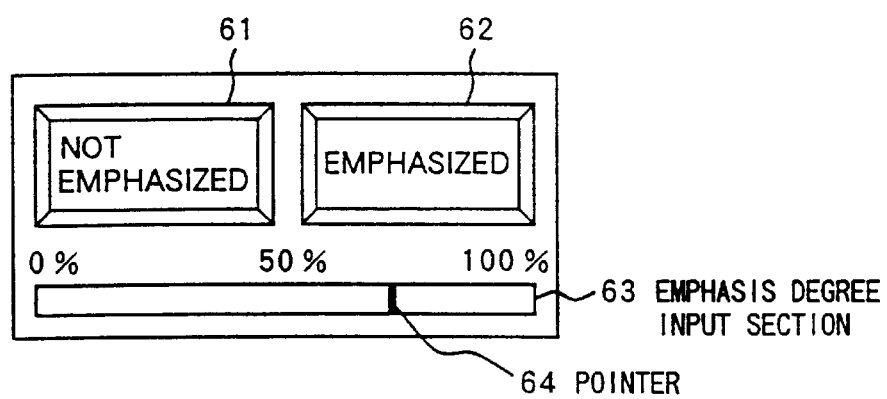
FIG. 6 shows an example interface for a means of emphasis specification in the third preferred embodiment of the present invention.

An emphasis specification section 32 comprises an interface for specifying a domain in the linear graphic image 203 to be emphasized and the degree of color emphasis in the domain by the operating unit 192. The interface contributes to filling out the emphasis column 23 in the coloring table 20 in the table storage 30. If the specified domain is not specified by the coloring item specification section 31 for specifying an item to be colored, the coloring table 20 in the table storage 30 is allocated four additional columns. The additional columns are the domain ID column 22, the emphasis column 23, the group ID column 24, and the color coordinate column 25. For example, the interface for the emphasis specification section 32 is implemented as two switches 61 and 62 shown in FIG. 6, and as an emphasis input section 63. The two switches 61 and 62 are specified by the operating unit 192 for selection. If the switch 61 for specifying no emphasis is valid, the emphasis column 23 in the coloring table 20 reads 0 percent.

If the switch 62 for specifying emphasis is valid, the domain in the linear graphic image 203 to be emphasized is specified by the operating unit 192. The emphasis column 23 in the coloring table 20 corresponding to the specified domain is assigned the value obtained by the emphasis input section 63. A value of 0 percent is cataloged as the degree of emphasis for the domains not specified. The emphasis input section 63 determines the degree of emphasis in the range of 0 to 100%, and is implemented as a slide switch in FIG. 6. A pointer 64 of the slide switch is moved horizontally and specifies the degree of emphasis by its position.

Figure 7:
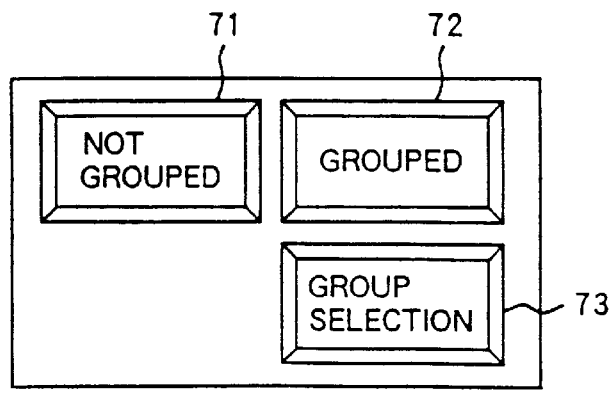
FIG. 7 shows an example interface for a grouping means in the third preferred embodiment of the present invention.

A grouping section 33 uses the operating unit 192 to specify a plurality of domains to be assigned in a linear graphic image 203 to fill out the group ID column 24 in the coloring table 20 stored in the table storage 30. If the domain specified by the grouping section 33 is not specified by the coloring item specification section 31 for specifying an item to be colored, the coloring table 20 in the table storage 30 is allocated new columns. The new columns include the domain ID column 22, the emphasis column 23, the group ID column 24, and the color coordinate column 25. For example, the interface for the grouping section 33 is implemented as two switches 71 and 72 shown in FIG. 7, and as a group selection button 73. The two switches 71 and 72 are specified by the operating unit 192 for selection. If the switch 71 for specifying no grouping is valid, the group ID column in the coloring table 20 is assigned different IDs.

If the switch for specifying grouping is valid, the operating unit 192 is used to specify a plurality of domains in the linear graphic image 203 to be assigned the same color. For the specified domain, the same ID is described in the group ID column 24 in the coloring table. The ID of a domain not specified is different from the ID of the specified domain. Pressing a group selection button 78 terminates processing for specifying a domain to be assigned the same color. A new specified domain is assigned a different group ID. Thus, pressing the group selection button 78 with two or more domain specified allows the handling of the domains as a group.

Figure 8:
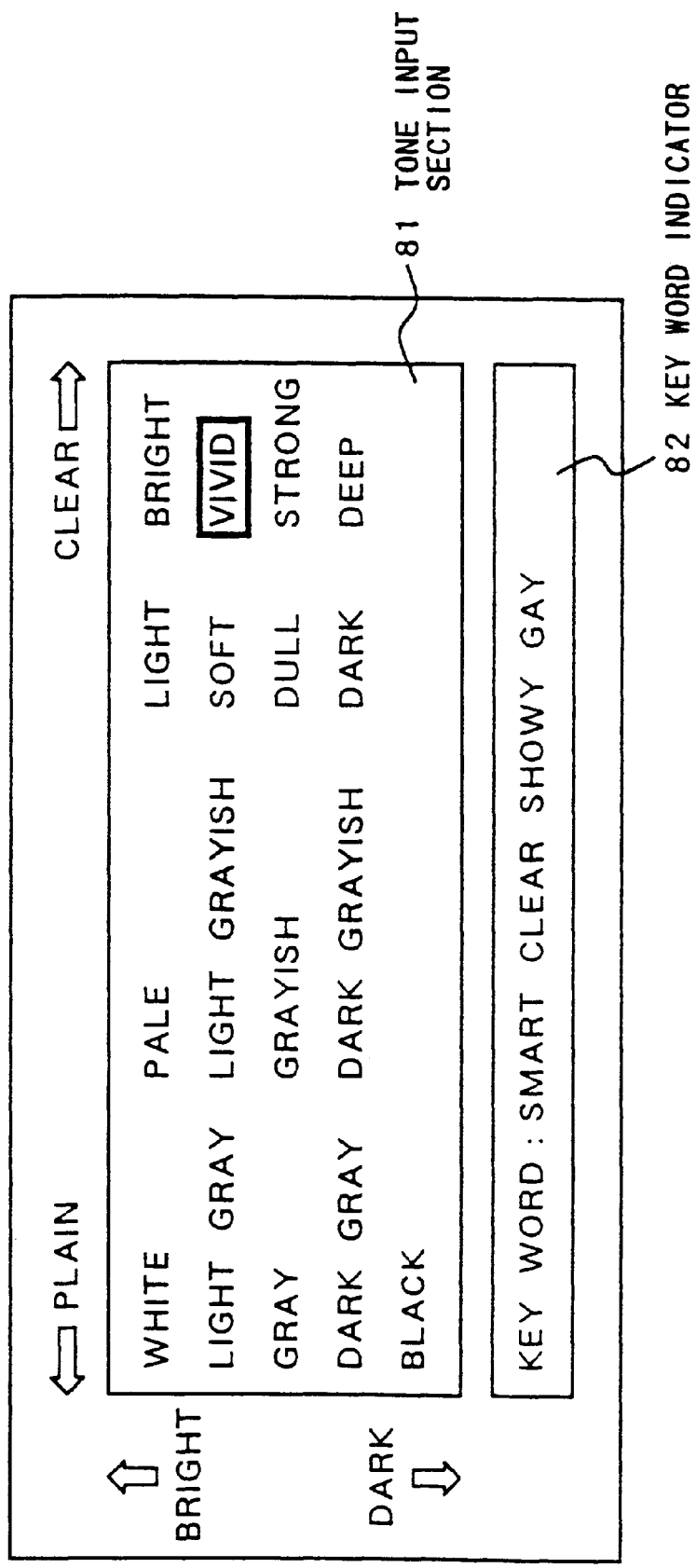
FIG. 8 shows an example interface for a tone specification means in the third preferred embodiment of the present invention.

A tone specification section 34 uses the operating unit 192 to specify what tone is to be applied to the whole linear graphic image 203 to be colored. This specification leads to filling out the whole color tone column 21 in the coloring table 20 stored in the table storage 30. FIG. 8 provides an example of an interface for the tone specification section 34. In a tone input section 81, 12 tone names 131 are displayed as shown in FIG. 13. The operating unit 192 allows the specification of one tone. A key word display provides the key word 132 corresponding to a selected tone. In FIG. 8, a vivid tone is selected.

A coloring section 36 comprises an execution button. Pressing the execution button outputs the startup signal 15. The coloring support apparatus 10 is configured in the same way as the coloring support apparatus in the first preferred embodiment. The coloring support apparatus 10 receives the startup signal 15 from the coloring section 36 to fill out the color coordinate column 25 in the coloring table 20 stored in the table storage 30. Then, it outputs the termination signal 19.

Figure 4:
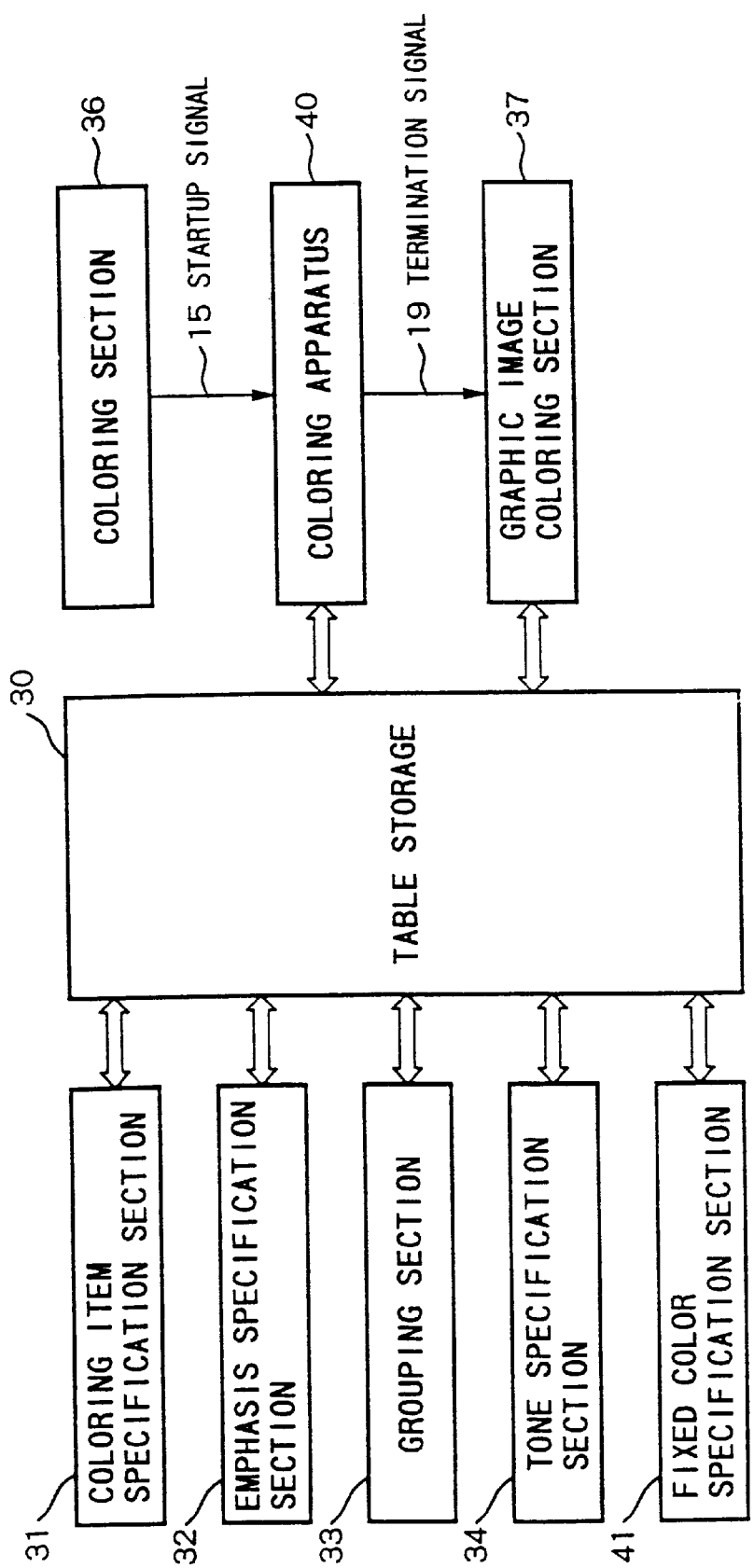
FIG. 4 provides a block diagram that illustrates the configuration of the fourth preferred embodiment of the present invention.

The following explains the fourth preferred embodiment of the present invention. FIG. 4 provides the block diagram indicating the configuration of the preferred embodiment. The preferred embodiment is enhanced by the addition of a fixed color specification section 41 for forced color specification to the above mentioned third preferred embodiment.

The fixed color specification section 41 is equipped with an interface for specifying a domain in the linear graphic image 203 for which a color is specified forcibly, and its color by the operating unit 192. When the fixed color specification section 41 is used to forcibly specify a color for a domain, the fixed color ID is described at the group ID column 24 in the coloring table 20 stored in the table storage 30. The forcibly specified color is described in the color coordinate column 25. For example, the interface for the fixed color specification section 41 is implemented as two switches 91 and 92 shown in FIG. 9. and as a color selection section 93. The two switches 91 and 92 are specified by the operating unit 192 for selection. If the switch 91 for specifying no fixed color is valid, no fixed color ID is described in the group ID column 24 in the coloring table 20.

Figure 9:
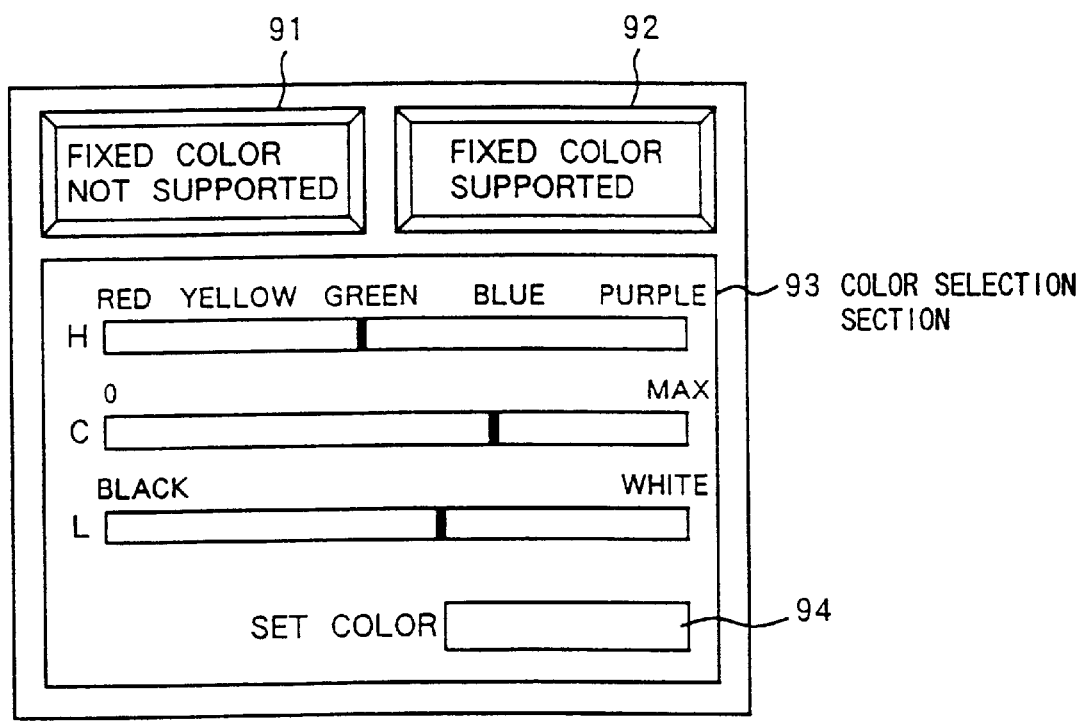
FIG. 9 shows an example interface for a fixed color specification means in the fourth preferred embodiment of the present invention.

If the switch 92 for specifying a fixed color is valid, the operating unit 192 is used to specify a domain in the linear graphic image 203 to be assigned the fixed color. When a domain is specified, the fixed color ID is described in the group ID column 24 in the coloring table 20, and coordinates of the color specified by the color selection section 93 are described in the color coordinate column 25. The color selection section 93 shown in FIG. 9 is implemented as a slide switch type input means for determining hue H, saturation C and brightness L independent of one another. As shown in FIG. 20, if a display screen is provided with the color selection area 201, the color selection area can replace the color selection section 93 shown in FIG. 9. As the color selection means for determining a fixed color, methods of color selection and correction disclosed in Japanese Patent Application Laid-open No. 203118/1994 can be used.

The coloring support apparatus 40 has the same configuration as the coloring support apparatus in the above mentioned second preferred embodiment. The coloring support apparatus 40 receives the startup signal from the coloring section 36, and fills out the color coordinate column 25 in the coloring table 20 stored in the table storage 30, outputting the termination signal 19. The other means are the same as those in the third preferred embodiment.

The switches used in the third and fourth preferred embodiments and shown in FIGS. 5 to 9 can be installed physically in the operating unit 192. Or, they can be implemented by a means for displaying a graphics user interface with similar functions in the color display 191 along with the rendering region and for using the cursor mark 204 for operation.

As explained above, the coloring support apparatus of the first preferred embodiment in the present invention enables the easy development of a document colored harmoniously. The requirement is only the specification of such coloring concepts as a domain in a linear graphic image to be colored and the degree of emphasis, domains to be assigned the same color, and a whole color tone.

The coloring support apparatus of the second preferred embodiment prevents the occurrence of the color with hue already used in a certain domain in other domains in addition to effects provided by the coloring support apparatus of the first preferred embodiment.

The method of and the apparatus for coloring support disclosed in the third and fourth preferred embodiments enable the interactive input of coloring concepts. The operator can efficiently carry out the job as checking the actual result of coloring.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments that can be embodied within a scope encompassed and equivalents thereof with respect to the feature set out in the appended claims.

What is claimed is:

1. A coloring support apparatus comprising:
    a table storage means for storing a coloring table having an emphasis column for describing the degree of color emphasis of a domain in a linear graphic image to be colored, and a color coordinate column for describing a color coordinate value in any color space in said domain to be colored for each image element constituting said linear graphic image, a whole color tone column for describing the impression of coloring for said linear graphic image;
    a color number determination means for determining the number of colors to be produced in said linear graphic image according to said coloring table stored in said table storage means;
    a hue determination means for determining hue values according to the number of colors obtained by said color number determination means for description in said color coordinate column in said coloring table;
    a reference coordinate determination means for determining the tone, saturation and brightness of a color corresponding to the impression of coloring described in said whole color tone column in said coloring table as the reference point on a plane with the same hue;
    a color generation means for determining the saturation and brightness values of the hue of colors to be generated on said linear graphic image according to coordinates of said plane with the same hue at said reference point obtained by said reference coordinate determination means for description in said color coordinate column in said coloring table; and
    a coloring means for referencing said coloring table covering a certain value in said each column to determine color coordinates for said color coordinate column and color said linear graphic image.

2. A coloring support apparatus as set forth in claim 1, wherein said coloring table stored in said table storage means includes a domain ID column for describing domain IDs to identify domains in graphic elements constituting said linear graphic image.

3. A coloring support apparatus as set forth in claim 1, wherein said color generation means moves said reference point on said plane with the same hue obtained by said reference coordinate determination means in the direction of emphasis predefined on said plane with the same hue according to the degree of emphasis described at said emphasis column in said coloring table stored in said table storage means to determine the saturation and brightness values of the hue of colors to be generated on said linear graphic image according to coordinates of said moved point on said plane with the same hue for description in said color coordinate column in said coloring table.

4. A coloring support apparatus comprising:
    a table storage means for storing a coloring table having an emphasis column for describing the degree of color emphasis of a domain in a linear graphic image to be colored, and a color coordinate column for describing a color coordinate value in any color space in said domain to be colored for each image element constituting said linear graphic image, a whole color tone column for describing the impression of coloring for said linear graphic image;
    a color number determination means for determining the number of colors to be produced in said linear graphic image according to said coloring table stored in said table storage means;
    a hue determination means for determining hue values according to the number of colors obtained by said color number determination means for description in said color coordinate column in said coloring table;
    a reference coordinate determination means for determining the tone, saturation and brightness of a color corresponding to the impression of coloring described in said whole color tone column in said coloring table as the reference point on a plane with the same hue;
    a color generation means for determining the saturation and brightness values of the hue of colors to be generated on said linear graphic image according to coordinates of said plane with the same hue at said reference point obtained by said reference coordinate determination means for description in said color coordinate column in said coloring table;
    a first input means for specifying said domain in said linear graphic image to be colored to set each column in said coloring table stored in said table storage means;
    a second input means for specifying a domain in said linear graphic image to be subjected to color emphasis, and the degree of emphasis in said domain to enter any value to an emphasis column in said coloring table stored in said table storage means;
    a third input means for specifying the whole color impression of said linear graphic image by said given key word to enter any value to said whole color tone column in said coloring table stored in said table storage means; and
    a coloring means for referencing said coloring table covering certain values in each column to determine color coordinates in said color coordinate column and color said linear graphic image.

5. A coloring support apparatus as set forth in claim 4, wherein said coloring table stored in said table storage means includes a domain ID column for describing domain IDs to identify domains in graphic elements constituting said linear graphic image.

6. A coloring support apparatus as set forth in claim 4, wherein said color generation means moves said reference point on said plane with the same hue obtained by said reference coordinate determination means in the direction of emphasis predefined on said plane with the same hue according to the degree of emphasis described at said emphasis column in said coloring table stored in said table storage means to determine the saturation and brightness values of the hue of colors to be generated on said linear graphic image according to coordinates of said moved point on said plane with the same hue for description in said color coordinate column in said coloring table.

7. A coloring support method comprising:

a step for entering the degree of color emphasis of a domain in a linear graphic image to be colored and the color coordinate values of any color space in said domain to be colored for each graphic element constituting said linear graphic image, as well as the impression of whole coloring in said linear graphic image by a certain predefined key word;

a step for calculating the saturation and brightness values of the hue of colors to be produced on said linear graphic image according to said entered emphasis degree, color coordinate value and key word; and a step for coloring said linear graphic image according to said calculated hue saturation and brightness values.

\* \* \* \* \*